United States Patent [19]
Karlsson

[11] 3,948,491
[45] Apr. 6, 1976

[54] PROCESS FOR BLENDING AN ADDITIVE SUCH AS COLOUR PIGMENT ETC. WITH A PLASTIC MATERIAL AND BLENDING APPARATUS INTENDED TO BE USED FOR SAID PROCESS

[75] Inventor: Kjell G. I. Karlsson, Tingsryd, Sweden

[73] Assignee: Perstorp AB, Perstorp, Sweden

[22] Filed: Mar. 28, 1974

[21] Appl. No.: 455,885

[52] U.S. Cl. .................. 259/21; 222/307; 259/191
[51] Int. Cl.² ...................... B01F 15/02; B29B 1/10
[58] Field of Search .............. 259/23, 24, 43, 8, 44, 259/66, 67, 191, 192, 6, 21, 41, 40; 222/307, 363

[56] References Cited
UNITED STATES PATENTS

| | | | |
|---|---|---|---|
| 1,273,720 | 7/1918 | Bachand | 222/307 |
| 3,370,837 | 2/1968 | Piot | 259/23 X |
| 3,560,430 | 2/1971 | Meyer et al. | 259/8 X |
| 3,578,209 | 5/1971 | Fraser | 222/307 X |
| 3,664,640 | 5/1972 | Morin | 259/8 |
| 3,865,355 | 2/1975 | Eau Claire | 259/21 X |
| 3,871,699 | 3/1975 | Hishida | 259/191 |

FOREIGN PATENTS OR APPLICATIONS

| | | | |
|---|---|---|---|
| 2,059,870 | 6/1971 | France | 259/6 |

*Primary Examiner*—Robert W. Jenkins
*Assistant Examiner*—James A. Niegowski
*Attorney, Agent, or Firm*—Stevens, Davis, Miller & Mosher

[57] ABSTRACT

Process for blending an additive such as colour pigment etc. with a plastic material, wherein the plastic material for instance in the shape of granules, pellets, grains or powder is introduced into a first hopper equipped with a stirrer. The first hopper is placed in a direct connection with a feed screw of a plastic moulding machine. The additive in the shape of granules, pellets, small tablets or big grains is charged into a second hopper which is joined to the first hopper by a dosing part including a dosing plate, which executes reciprocating motions and is equipped with at least one hole, and a dosing pipe, a dosing hose or the like. The amount of additive fed to the first hopper is intended to be regulated by varying the number of reciprocating motions of the dosing plate per unit of time and/or by varying the plate thickness and/or by varying the hole size of the dosing plate and/or by varying the number of holes in the dosing plate.

2 Claims, 1 Drawing Figure

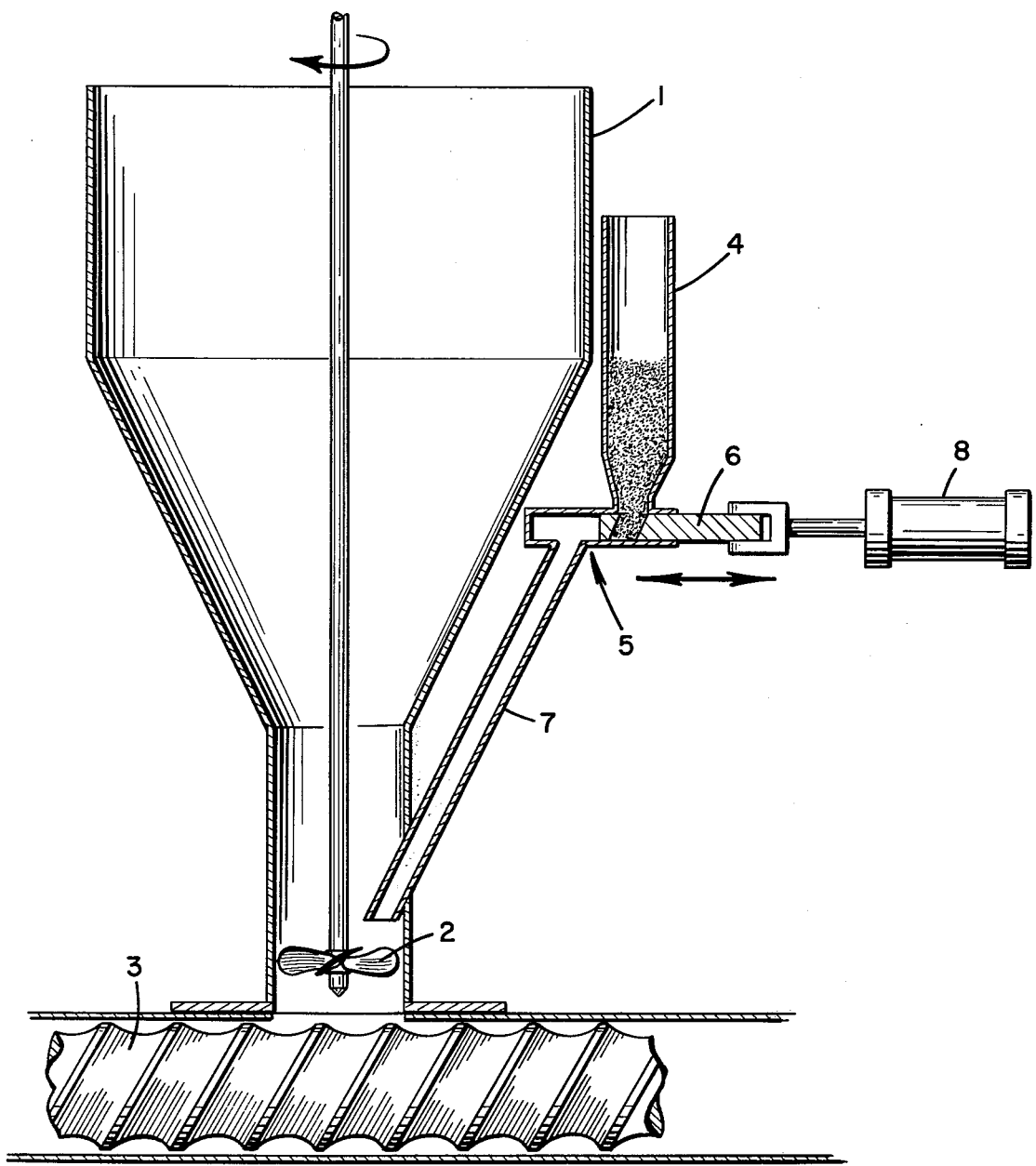

PROCESS FOR BLENDING AN ADDITIVE SUCH AS COLOUR PIGMENT ETC. WITH A PLASTIC MATERIAL AND BLENDING APPARATUS INTENDED TO BE USED FOR SAID PROCESS

The present invention relates to a process for blending an additive such as colour pigment etc. with a plastic material and a blending apparatus intended to be used for said process.

To obtain a coloured plastic article for example by injection moulding one can use a prepigmented, granulated plastic material. This material is very expensive. Moreover, to meet the demand of the market a large colour assortment must be kept in stock. From a viewpoint of cost it is therefore not realistic to use prepigmented material more than in exceptional cases. A cheaper raw material is obtained if a granulated, unpigmented plastic material is used. Said material is blended with powdered colourant prior to delivering to the machine hopper. However, this system which is very usual has many drawbacks. For instance, the plastic granulate and the colour pigment must be mixed with each other for about 10 – 20 minutes before it can be used. Furthermore, to get an even distribution of the colour pigment on the plastic granules, the blending time must be carefully adapted from case to case depending on the kind of plastic material and pigment used. On account of the handling difficulties at the blending and at the transportation from the blending apparatus to the plastic moulding machines, there is a relatively great need of staff at said process.

However, the most serious disadvantage is the health risk being present at the blending process and to a certain degree at the subsequent handling too. The pulverized pigment, which is often poisonous, "smokes" namely around in the building. Thus, the staff get a lot of colour pigment on their skin and also in their respiratory organs.

According to the present invention the above-mentioned disadvantages of the previous processes have been avoided and a process for blending an additive such as colour pigment etc. with a plastic material has been brought about. Said process is characterized in that the plastic material for instance in the shape of granules, pellets, grains or powder is introduced into a first hopper which is equipped with a stirrer and placed in a direct connection with a feed screw of a plastic moulding machine. The additive in the shape of granules, pellets, small tablets or big grains is charged into a second hopper which is joined to the first hopper by a dosing part including a dosing plate and a dosing pipe, a dosing hose or the like. Said dosing plate executes reciprocating motions and is equipped with at least one hole. The amount of additive fed to the first hopper is intended to be regulated by varying the number of reciprocating motions of the dosing plate per unit of time and/or by varying the plate thickness and/or by varying the hole size of the dosing plate and/or by varying the number of holes in the dosing plate.

The operation of the dosing plate can be arranged in an optional way, for example by the help of an air cylinder or an electromotor.

At the process according to the invention the stirrer is suitably rotated continuously. Furthermore, the motion of the dosing plate is electronically co-ordinated with the motion of the feed screw of the plastic moulding machine. Thus, the dosing is started when the screw begins to move forward and is interrupted when the screw has returned to its back position. Then the same motion model is repeated again.

Our process has many advantages, especially at the colouring of unpigmented plastic material. Then there is preblended material for only one article at a time, which is very advantageous in the event of a machine fault.

By the ingenious and very reliable dosing apparatus which is used at the process according to the present invention one can adjust the desired colour proportion of the plastic material in an easy way. It is just necessary to make some simple tests to find out which hole size of the dosing plate and which number of reciprocating motions per unit of time that are necessary to obtain the desired proportion of colour.

The dosing is brought about in such a way that the dosing plate is brought back to its back position, some colour granules, pellets, small tablets or big grains are falling down into the hole of the plate. At the advancing motion of the plate, the colour granules or the like are charged down through the dosing pipe to the hopper containing plastic material. In said hopper the colour granules are blended with the plastic material by the help of the stirrer. Of course, if the size of the dosing hole or the thickness of the plate is increased, more colour pigment will be charged per unit of time into the hopper containing plastic material at a constant motion model of the dosing plate. Then, the colour proportion of the produced plastic article will be increased to a corresponding degree too. To simplify the process it is certainly most suitable to use a constant plate thickness and only vary the hole size and the motion model of the plate.

Of course, the dosing can be carried out in the same way even if the shape of the dosing plate is changed. For instance, the plate can be cylindrical. It can be equipped with many through holes too. Naturally, the surrounding casing must have a shape corresponding to that of the dosing plate.

By using colour pigment in the shape of granules, pellets, small tablets or big grains according to the invention, the above-mentiond health risks originating from the colour pigment particles flying around are avoided. Moreover, the colouring can be automated in a very labour-saving way.

The present invention will be explained more in detail in connection with the enclosed FIGURE, which shows a cross-section of a blending apparatus according to the invention.

The apparatus includes a hopper 1 for keeping plastic material for instance in the shape of granules, pellets, grains or powder. In the hopper 1 a stirrer 2 is placed. Suitably the stirrer is continuously rotated during the whole blending and moulding course. Its speed can be for instance 225 revolutions per minute. However, the stirring speed is not critical but can be varied within wide limits. The hopper 1 is placed in a direct connection with a feed screw 3 of a plastic moulding machine. A second hopper 4 intended for keeping an additive such as colour pigment in the shape of granules, pellets, small tablets or big grains is joined to the hopper 1 by a dosing part 5 including a dosing plate 6 and a dosing pipe, a dosing hose or the like 7. The plate 6 is intended to execute reciprocating motions and it is equipped with at least one hole. The pipe 7 runs into the lower part of the hopper 1 somewhat above the stirrer 2. The supply of additive from hopper 4 to hopper 1 can be regulated by varying the number of reciprocating motions of the plate 6 per unit of time, pssibly in combination with a change of the hole size and/or the number of holes and/or the thickness of the dosing plate 6. The dosing plate can be driven by the help of an air cylinder or an electromotor 8.

Before the moulding process can start, the hopper 1 is filled with the uncoloured plastic material and the hopper 4 is filled with the colour pigment. The stirrer 2 is rotated continuously during the whole blending and moulding course. The motions of the dosing plate 6 and the screw 3 are electronically co-ordinated in a way not shown. Then the dosing starts at the same time as the screw starts to advance and is interrupted when the screw has returned to its back position. In this way the feeding and blending courses are repeated.

The invention is not limited to the use of a special kind of moulding machine. It can be used for all kinds of plastic moulding machines which include a feed screw. It can be used for thermoplastics as well as for thermosets. Even if the invention is mainly intended for working plastic material it can, however, be used to the same extent for blending different additives with rubber.

I claim:

1. An apparatus for molding a plastic comprising
   a screw enclosed in a first housing for feeding plastic material to a molding means,
   an opening in said first housing,
   a first hopper for storage of plastic material having its longitudinal axis substantially perpendicular to that of the first housing and having a tubular portion communicating with the opening,
   a second hopper for storage of a material to be mixed in metered amounts with the plastic material,
   a second housing having its longitudinal axis substantially perpendicular to that of the first hopper, said second housing having an upper wall, a bottom wall and sidewalls enclosing a space,
   a first opening in the said upper wall and a second opening in the said lower wall spaced longitudinally from the first opening, said second hopper being disposed above said first opening and communicating therewith,
   a reciprocating plate having an opening therethrough disposed in the space enclosed by the second housing and slidably disposed against the upper and lower walls of the second housing, whereby the volume of the said metered amounts is determined by the number of openings in the plate, the cross-section of the openings in the plate, the number of reciprocating motions of the plate per unit of time, and the thickness of the plate,
   a conduit communicating from said second opening and with said tubular portion immediately above the opening in the first housing,
   a stirrer disposed in the tubular portion of the first housing adjacent to the point where said conduit communicates with the tubular portion, and
   means for sliding the plate back and forth to alternately align the opening therethrough with said openings in the upper and lower walls.

2. The apparatus of claim 1 wherein the space enclosed by said second housing is parallelpiped shaped.

* * * * *

UNITED STATES PATENT AND TRADEMARK OFFICE
CERTIFICATE OF CORRECTION

PATENT NO. : 3,948,491
DATED : April 6, 1976
INVENTOR(S) : KJELL G. I. KARLSSON

It is certified that error appears in the above—identified patent and that said Letters Patent are hereby corrected as shown below:

Column 2, line 16, after "that", insert --- when ---.

Column 2, line 42, change "above-mentiond" to --- above-mentioned ---.

Column 3, line 1, change "pssibly" to --- possibly ---.

Column 4, line 32, change "parallelpiped" to --- parallelepiped ---.

Signed and Sealed this

Third Day of August 1976

[SEAL]

Attest:

RUTH C. MASON
Attesting Officer

C. MARSHALL DANN
Commissioner of Patents and Trademarks